United States Patent [19]

Bournes

[11] Patent Number: 5,287,371
[45] Date of Patent: Feb. 15, 1994

[54] LASER PUMP MODULE

[75] Inventor: Patrick A. Bournes, Reston, Va.

[73] Assignee: Fibertek, Inc., Herndon, Va.

[21] Appl. No.: 25,125

[22] Filed: Mar. 2, 1993

Related U.S. Application Data

[63] Continuation of Ser. No. 835,825, Feb. 18, 1992, abandoned.

[51] Int. Cl.$^5$ .................................................. H01S 3/04
[52] U.S. Cl. ...................................... 372/35; 372/92; 372/65; 372/72
[58] Field of Search .................. 372/34, 35, 92, 107, 372/69, 65

Primary Examiner—Léon Scott, Jr.
Attorney, Agent, or Firm—Herman Hohauser

[57] ABSTRACT

An improved housing for use in a laser pump module, including a laser rod housed within a sleeve and laser diodes providing the rod excitation, wherein the main housing structure is constructed from a single piece of material and formed with internal interconnected internal passageways to provide for efficient cooling of the pump sources and the sleeve provides the outer wall of the coolant passage for cooling of the laser rod.

1 Claim, 3 Drawing Sheets

LASER PUMP MODULE

This is a continuation of application Ser. No. 07/835,825 filed Feb. 18, 1992 abandoned Jun. 1, 1993.

BACKGROUND OF THE INVENTION

1. FIELD OF THE INVENTION

The present invention relates to light emitting diode array assemblies for diode pumped lasers and, in particular, to such assemblies having mounting means for removal of heat generated by the light emitting diodes and laser rod.

2. DESCRIPTION OF THE PRIOR ART

Because the amount of excitation energy generated by a single light-emitting diode is not sufficient, a plurality of such diodes are required to be mounted around the laser rod in close enough proximity to such rod to provide the prerequisite excitation energy. As the diodes are not 100% efficient, some of the energy supplied is converted to waste heat. This heat, if not removed from the diodes, will cause a wavelength shift and reduction in the efficiency of the laser system.

In addition, the heat generated within the laser rod can be detrimental to the laser system's operation. Specifically, the index of refraction can become non-uniform and severe therma/mechanical stress can also result causing a distorted output.

The challenge of removing heat generated within laser rods and by the light emitting diode array assemblies used to excite the laser rods has resulted in various alternative structures.

The circulation of a coolant fluid in close proximity to the diodes and along the surface of the rod is a known method of removing the unwanted heat. Heretofore, diode pumped lasers housing structures having coolant fluid passages in close proximity to the rod and diode arrays have been utilized with moderate degrees of success. None of the known designs for heat absorption provide simultaneous coolant flow in close proximity to both the rod and the diode arrays utilizing a monolithic housing structure and a single supply of coolant.

SUMMARY OF THE INVENTION

The present invention provides an improved housing structure for cooling laser pump diode arrays and the laser rod. Passageways for coolant flow are provided through a monolithic housing structure to ensure that the coolant fluid passes in close proximity to the diode arrays and in direct contact with the laser rod. The passageways are interconnected such that there is a single entry port and a single output port through which the coolant passes. This passageway design allows for a single pump means to provide sufficient coolant flow.

The monolithic housing is formed with mounting holes in which a tubular sleeve is provided. The sleeve surrounds the laser rod and forms a passageway through which the coolant flows in direct contact with the rod for efficient absorption of the heat generated within the rod. Other passageways formed in the housing are provided in parallel oriented trods upon which the diode arrays are mounted. The trods absorb heat generated by the diodes which is then absorbed by the coolant flowing through the trod passageways. End plate sections of the housing have passageways that serve to interconnect the passageways formed by the laser rod sleeve and in the trods.

BRIEF DESCRIPTIONS OF THE DRAWING

DESCRIPTION OF THE PREFERRED EMBODIMENT

Figure 1:
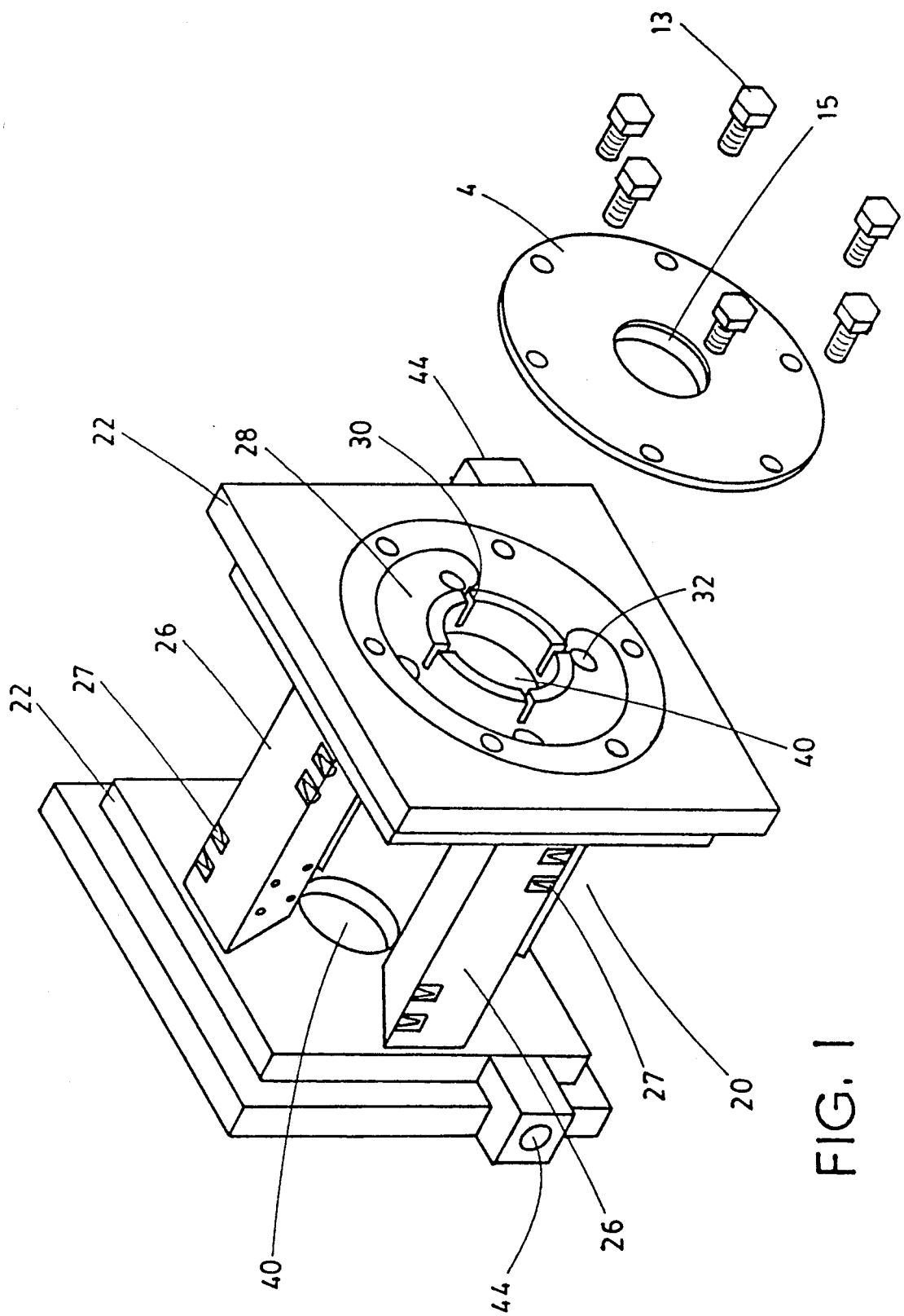
FIG. 1 is a perspective view of preferred embodiment of the monolithic housing.

Referring to FIG. 1, monolithic housing 20 of laser pump module 10 is shown in a three dimensional view and is seen in a preferred embodiment to consist of two mirror imaged symmetrical end plates 22 and four identical parallel mounting sections or trods 26 upon which, as will be explained in more detail below, diode arrays are positioned.

Housing 20 is constructed with internally formed interconnected passageways in end plates 22 and trods 26 through which coolant can flow.

Figure 2:
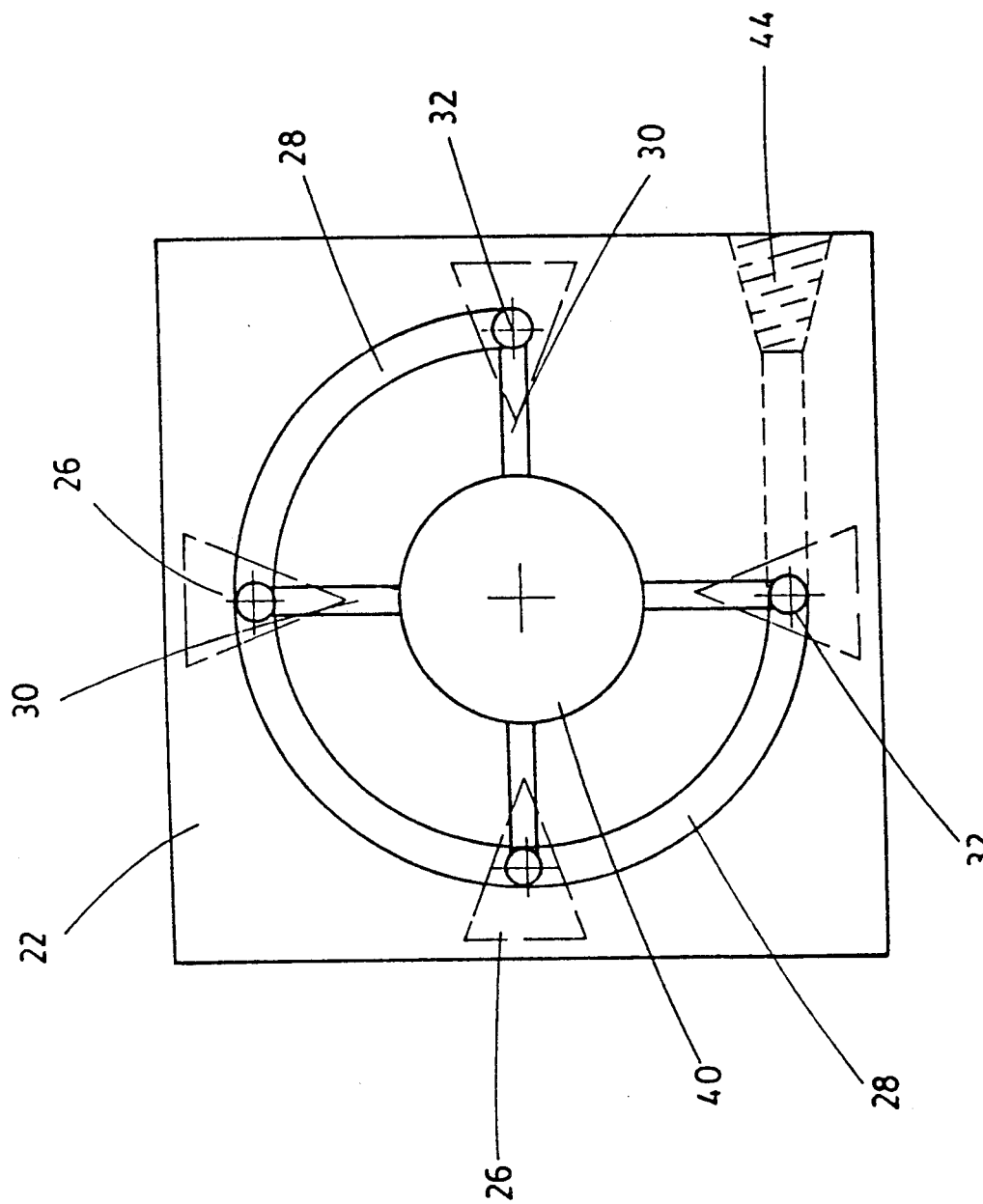
FIG. 2 is an end-view of the monolithic housing illustrating the end plate and passageway formed therein.
Figure 3:
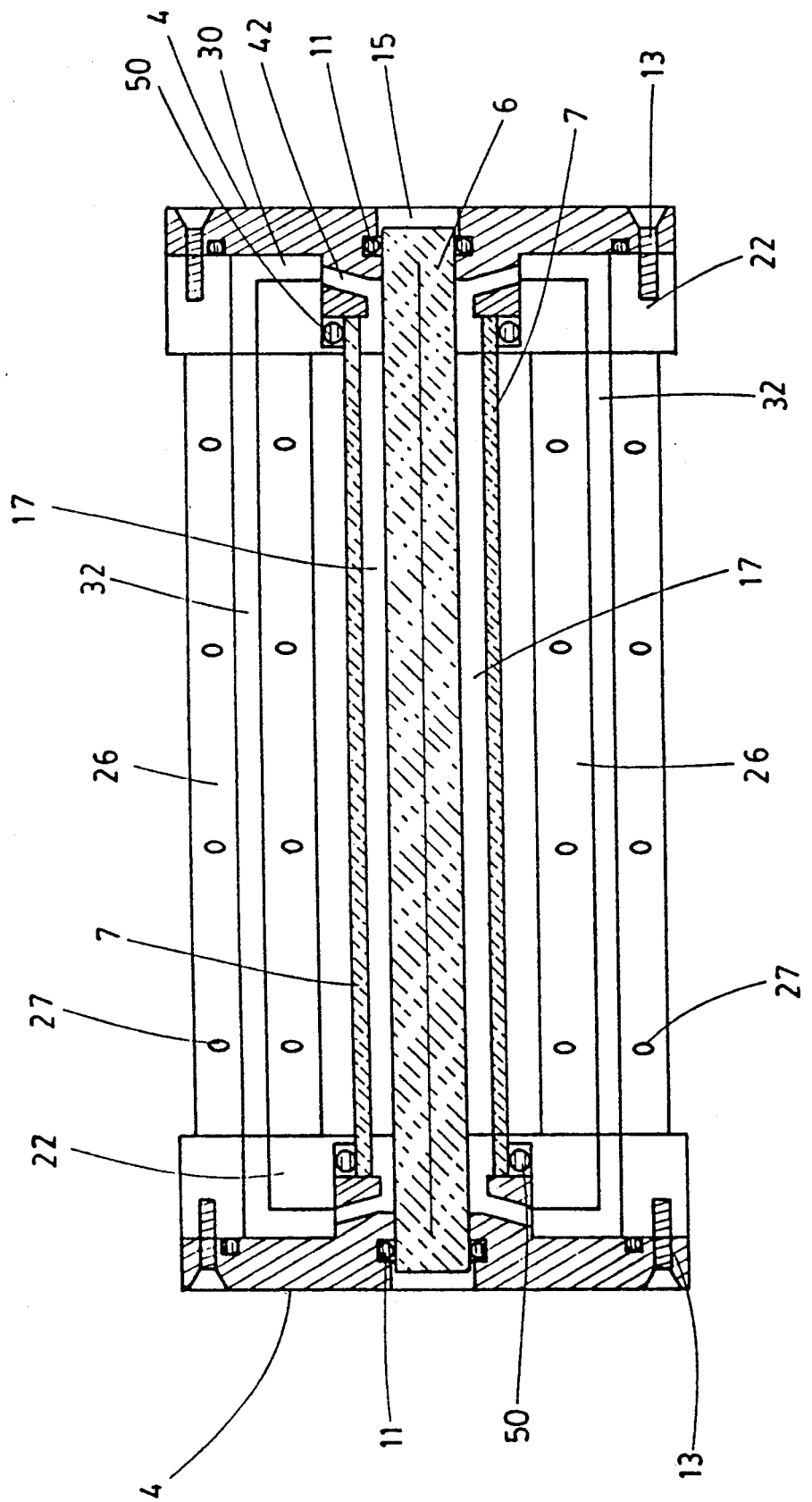
FIG. 3 is a side-view of the monolithic housing illustrating the laser pump module components, including the laser rod, sleeve and cover plate.

The coolant passageways in end plate 22 is seen in FIG. 2 to be a circular shaped manifold 28 and four identical access channels 30. The coolant passageway in trods 26 are best seen in FIG. 3 as channels 32. Each of the respective channels 32 end in manifold 28 of end plates 22.

Referring again to FIG. 2, end plates 22 have formed therein a circular shaped mounting hole 40. Access channels 30 end at the circumference of hole 40 leading into channels 42 in cover plate 4. Specifically, in the preferred embodiment illustrated in FIG. 3, these four channels 42 formed internally in cover plate 4 opening into channel 17 from channels 30. Manifold 28 begins at opening 44 located at the edge of end plate 22 and ends at 46.

Referring now to FIG. 3, a cross-sectional view of housing 20 is shown with the essential elements of the preferred embodiment of laser pump module 1 consisting of laser rod 6, sleeve 7 and cover plates 4. Sleeve 7 is mounted in holes 40 of end plate 22 supported by o-rings 50. O-rings 50 provide a fluid seal and is the sole support for sleeve 7. The friction between sleeve 7 and o-ring 50 prevents the sliding of the sleeve so that it is held in a stationery position. Access channels 30 lead into the mouth of sleeve 7 via opening 42 in cover plate 4 to form a continuation of the coolant flow path around rod 6 through channel 17. It is necessary for the sleeve to be transmissive at the pump wavelength, have the ability to accept anti-reflection coating and have sufficient strength and durability for its intended purposes. In the preferred embodiment, sleeve 7 is sapphire; however, any material having the necessary above-listed characteristics may be used without detracting from the inventive concept. Cover plates 4 are mounted to housing 20 at end plates 22 and in the preferred embodiment are secured by bolts 13. Each end of rod 6 is mounted in the respective mounting hole 15 formed in each cover plate 4 and is supported by o-rings 11. O-rings 21 located within cover plate 4 seal the outer perimeter of manifold 28 from coolant leakage.

In the preferred embodiment, diode arrays are mounted upon trods 26 in pre-formed counter sink hoes 27 and provide the light source for excitation of laser rod 6 as is well known in the art. The diodes are mounted in a conventional manner and are not disclosed herein. It is understood that a variety of diode array configurations may be used and is not part of the claimed invention.

As can be seen by referring to the appropriate Figures, the coolant path begins at either of the openings 44 in end plates 22. Coolant is pumped into opening 44 and manifold 28 and continues to flow through channels 32 located in each trod 26, access channels 30 and channel 17 into the other end plate 22. It should be obvious that upon reaching the other end plate 22, the coolant flows into manifold 28 thereof and out opening 44. In this mode of operation, heat generated by laser rod 6 and the diode arrays mounted on trods 26 is absorbed by the coolant as it flows through the housing 20 in an extremely efficient manner. An alternative design for coolant flow makes use of the existing channels 17 and 32 without the manifold 28. In this alternative design, the coolant would flow in one continuous passage through the coolant channels at higher pressure.

The coolant in the preferred embodiment is purified deionized water. In a laser system consisting of more than one laser pump module, the coolant flow can be directed in and out of each module in the system in series. In this embodiment, the coolant would flow from the first module into the second and subsequent modules in a series configuration.

A typical flow rate presently used with these assemblies is 1 gallon/minute. A typical pressure drop across a single laser pump module is 5 psi. The coolant at the pump source is kept at 15 degrees Celsius (the temperature at which the present laser rod performs ideally). Although the coolant might travel through five or six laser head assemblies, the overall rise in coolant temperature is only several degrees (not more than 2) because the flow rate is high compared to the heat generated by the diodes.

The structure of the monolithic housing and the method of assembly of the laser pump module using such housing in the most expedient manner and according to present invention has been disclosed herein in accordance with the provisions of the patent statutes and regulations. It should be understood that the invention is defined in the following claims may be practiced and/or modified in various other ways than as specifically illustrated and described within the scope of these claims.

What is claimed is:

1. A method of constructing a laser pump module, including the steps of:
   a. providing a monolithic housing having internally formed coolant passageways;
   b. installing a sleeve coated with an anti-reflectant and transmissive to light energy in said housing forming an additional coolant passageway;
   c. providing sealing means between said housing and said sleeve to prevent coolant leakage therebetween
   d. installing a laser rod in said housing within said sleeve;
   e. providing sealing means between said housing and said laser rod to prevent coolant leakage therebetween;
   f. mounting a plurality of rod excitation means on portions of said housing close to said internally formed passageways; and,
   g. providing a coolant flow through said internally formed passageways and said sleeve to simultaneously cool said rod excitation means and said laser rod.

* * * * *